(12) United States Patent
Ishidoshiro (10) Patent No.: US 7,574,225 B2
(45) Date of Patent: Aug. 11, 2009

(54) ACCESS POINT

(75) Inventor: Takashi Ishidoshiro, Nagoya (JP)

(73) Assignee: Buffalo Inc., Nagoya (JP)

( * ) Notice: Subject to any disclaimer, the term of this patent is extended or adjusted under 35 U.S.C. 154(b) by 294 days.

(21) Appl. No.: 10/548,995

(22) PCT Filed: Feb. 25, 2004

(86) PCT No.: PCT/JP2004/002227

§ 371 (c)(1),
(2), (4) Date: Sep. 9, 2005

(87) PCT Pub. No.: WO2004/082213

PCT Pub. Date: Sep. 23, 2004

(65) Prior Publication Data

US 2006/0194597 A1    Aug. 31, 2006

(30) Foreign Application Priority Data

Mar. 10, 2003   (JP)   ................................ 2003-063081

(51) Int. Cl.
*G06F 15/16* (2006.01)
(52) U.S. Cl. ...................................... 455/509; 455/41.2
(58) Field of Classification Search ................. 370/201,
370/203, 332, 333; 455/436, 442, 452.1,
455/41.2, 509; 340/459
See application file for complete search history.

(56) References Cited

U.S. PATENT DOCUMENTS

| 5,225,841 | A | * | 7/1993 | Krikorian et al. | ........... 342/204 |
| 5,426,420 | A | * | 6/1995 | Nagler | .................. 340/825.01 |
| 6,006,092 | A | * | 12/1999 | Ward | .......................... 455/438 |
| 6,195,327 | B1 | * | 2/2001 | Lysejko et al. | .............. 370/201 |
| 2001/0015967 | A1 | | 8/2001 | Sugiura | |
| 2002/0181417 | A1 | | 12/2002 | Malhotra et al. | |
| 2003/0040319 | A1 | | 2/2003 | Hansen et al. | |

FOREIGN PATENT DOCUMENTS

| EP | 1096730 A1 | 5/2001 |
| EP | 1257090 A1 | 11/2002 |
| JP | 6-37762 | 2/1994 |
| JP | 2000-22712 | 1/2000 |
| JP | 2002-158667 | 5/2002 |
| JP | 2003-37607 | 2/2003 |
| JP | 2003-249973 | 9/2003 |
| WO | WO00/02353 | 1/2000 |

OTHER PUBLICATIONS

Supplementary European search report in corresponding European Application No. 04714487.8, dated Mar. 24, 2009.

* cited by examiner

*Primary Examiner*—Sam Bhattachrya
(74) *Attorney, Agent, or Firm*—Beyer Law Group LLP (57) ABSTRACT

An access point (10) for providing a wireless LAN, comprising: a communication unit (110) that performs a wireless LAN communication; a status determination unit (120) that, constituted by separate from hardware constituting the communication unit (110), determines radio wave statuses on each of a plurality of channels; a wireless communication control unit (119) that selects, on the basis of the determined radio wave statuses, a channel use for the wireless LAN communication; and a communication CH switch unit (118) that switches from a channel currently performing the wireless LAN communication to the selected channel.

9 Claims, 10 Drawing Sheets

| CHANNEL NO. | PRIORITY SEQUENCE | OUTPUT SOURCE | DUTY FACTOR | |
|---|---|---|---|---|
| | | | LOCAL | REMOTE |
| 1 | 14 | HR | – | – |
| 2 | 13 | HR | – | – |
| 3 | 9 | 11b | – | – |
| 4 | 7 | 11b | 30% | 50% |
| 5 | 8 | 11b | – | – |
| 6 | 10 | MW | – | – |
| 7 | 12 | MW | – | – |
| 8 | 11 | MW | – | – |
| 9 | 6 | 11b | – | – |
| 10 | 5 | 11b | – | 20% |
| 11 | 4 | 11b | – | – |
| 12 | 3 | FREE | – | – |
| 13 | 2 | FREE | – | – |
| 14 | 1 | FREE | – | – |

OUTPUT SOURCE
FREE: FREE CHANNEL
11b: IEEE 802.11b WIRELESS LAN DEVICE
MW: MICROWAVE OVEN
HR: HAM RADIO

(a) ACCESS POINT (b) MICROWAVE OVEN (c) HAM RADIO

Fig.11

WIRELESS LAN FREQUENCY BANDS

| CHANNEL NO. | CENTER FREQUENCY | FREQUENCY BAND | | |
|---|---|---|---|---|
| 1 | 2412 | 2401 | ~ | 2423 |
| 2 | 2417 | 2406 | ~ | 2428 |
| 3 | 2422 | 2411 | ~ | 2433 |
| 4 | 2427 | 2416 | ~ | 2438 |
| 5 | 2432 | 2421 | ~ | 2443 |
| 6 | 2437 | 2426 | ~ | 2448 |
| 7 | 2442 | 2431 | ~ | 2453 |
| 8 | 2447 | 2436 | ~ | 2458 |
| 9 | 2452 | 2441 | ~ | 2463 |
| 10 | 2457 | 2446 | ~ | 2468 |
| 11 | 2462 | 2451 | ~ | 2473 |
| 12 | 2467 | 2456 | ~ | 2478 |
| 13 | 2472 | 2461 | ~ | 2483 |
| 14 | 2484 | 2473 | ~ | 2497 |

(MHz)

ACCESS POINT

TECHNICAL FIELD

The present invention relates to an access point of a wireless local area network, and particularly to an access point that selects from among a plurality of channels a channel that is suitable for exchange of information, to perform communication with a wireless local area network.

BACKGROUND ART

Figure 11:
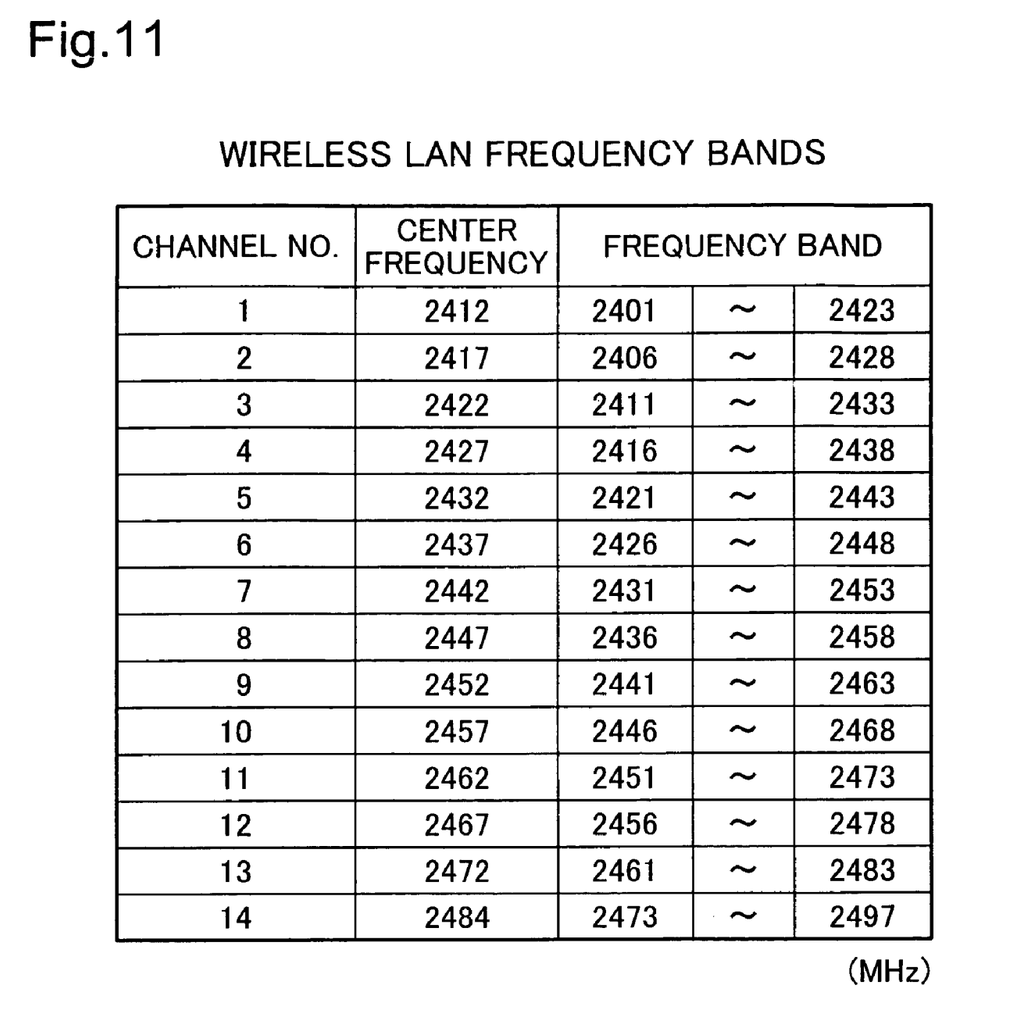
FIG. 11 is an illustration showing frequency bands of channels in wireless LAN communications.

In a wireless local area network (hereinafter "wireless LAN") based on the IEEE 802.11b standard, as depicted in FIG. 11, for example, a total of 14 channels with bandwidth of 22-24 megahertz (hereinafter denoted as MHz) with a center frequency of 2412-2384 MHz are assigned for exchange of information, for the purpose of wireless LAN communication. A wireless LAN is composed of an access point composed of a base station that is the center of the wireless LAN, and a terminal device which is a mobile unit, with wireless LAN communications being carried out between these wireless LAN devices. Each wireless LAN device on a single wireless LAN cannot simultaneously perform wireless LAN communication on different channels; rather, all wireless LAN communication is performed using a single selected channel. Radio wave status on this selected channel can be adversely affected due to various causes. Radio wave status can be adversely affected by communication conflicts arising when the same channel is used by a large number of wireless LAN devices, by radio wave interference occurring when other wireless LAN devices located nearby use an overlapping frequency band, or by radio wave interference with radio waves output by other devices that are not wireless LAN devices. If a channel with deteriorated radio wave status is used for wireless LAN communications, wireless LAN communication speeds may drop, or communication may become impossible.

As an access point that is able to deal with such deterioration of radio wave status, there is known in the art to date an access point that using communication means for carrying out wireless LAN communications detects radio wave status on multiple channels, and reselects a channel based on the detected radio wave status. This access point periodically interrupts wireless LAN communications to detect radio wave status on multiple channels using the communication means that was carrying out wireless LAN communications. On the basis of the detected radio wave status, it reselects a channel suitable for communications, switches the system to the reselected channel, and reopens wireless LAN communication. As a result, the prior art access point, when encountering deterioration of radio wave status on the channel on which wireless LAN communications are being performed, can switch to a channel with better radio wave status and reopen wireless LAN communication, thus avoiding a drop in communication speed or inability to communicate due to deteriorated radio wave status.

Japanese Published Unexamined Patent Application No. 2002-158667 teaches an access point that uses the communication means for carrying out wireless LAN communications to detect radio wave status of multiple channels, and reselects a channel based on detected radio wave status.

However, with the prior art access point, it was necessary to interrupt wireless LAN communications periodically in order to detect radio wave status. Since information cannot be exchanged during interruption of wireless LAN communications, a resultant problem was that, in instances of good communication for example, effective communication speed is actually lower.

With the foregoing in view, it is an object of the present invention to provide an access point that is able to avoid lowering effective communication speed due to detection of radio wave status for performing channel reselection.

DISCLOSURE OF THE INVENTION

To address the aforementioned problem, the access point of the present invention is an access point for providing a wireless local area network communication to a terminal device by using any one of a plurality of channels of different frequency bands to perform exchange of information, for the purpose of connecting the terminal device to a wide area network, comprising: a wireless communication unit that exchanges information via the wireless local area network; a status determination unit that, composed of hardware separate from hardware for realizing the wireless communication unit, determines radio wave statuses on each of the plurality of channels; a channel selection unit that selects, on the basis of the determined radio wave statuses, a channel for use in exchange of information by the wireless communication unit; and a channel switching unit that switches from a channel currently performing for use in exchange of information by the wireless communication unit to the selected channel.

According to the access point of the present invention, radio waves for performing wireless LAN communication and radio waves for performing determination of radio wave status can be handled physically with the same timing. Specifically, wireless LAN communication and determination of radio wave statuses for the purpose of channel reselection can be performed in parallel. Thus, exchange of information via the wireless LAN can be performed even while radio wave statuses are being determined for the purpose of channel reselection. Accordingly, a drop in effective communication speed due to detection of radio wave statuses for the purpose of channel reselection can be avoided. Here, performance of wireless LAN communication and radio wave status determination in parallel refers to carrying out determination of radio wave status, without interrupting wireless LAN communications. That is, it refers to executing determination of radio wave status without affecting execution of wireless LAN communications. In this instance, determination of radio wave status is not limited to being performed constantly, but may instead be carried out intermittently at fixed or random intervals, or carried out when triggered by a predetermined condition. Of course, radio wave status determination may be performed in instances where wireless LAN communications are not being performed.

The aforementioned status determination unit may comprise a duty factor determination unit that determines, as the radio wave status, a duty factor which is a time period in which radio waves are used by either one of the access point and another access point in a given time period. With this access point, duty factor can be used as a decision element for channel selection. Thus, channel reselection can be carried out in consideration of the extent of communication conflict due to use of a given channel by a large number of wireless LAN devices.

Alternatively, the aforementioned status determination unit may comprise an output source determination unit that determines, as said radio wave status, an output source of a radio wave that is the radio wave output by any of a plurality of devices, include the access point, using the frequency band of the plurality of channels. With this access point, radio wave output source can be used as a decision element for channel selection. Thus, channel reselection can be carried out in consideration of radio wave interference due to the use of a channel with overlapping frequency band by another nearby wireless LAN device, or radio wave interference with radio waves output by another device on a different wireless LAN.

The aforementioned output source determination unit may comprise a wave detection unit that detects a radio wave of each frequency of the plurality of channels; an extraction unit that extracts a pattern of temporal change in availability of the detected radio wave; and a determination unit that compares the extracted pattern with patterns of temporal change in availability of a detected radio waves hypothesized to be output from the plurality of devices, to determine the output source of the detected radio wave which has been output from any of the plurality of devices. With this access point, the output source of a detected radio wave can be determined by means of comparing the pattern of temporal change of the detected wave with patterns of temporal change of radio waves hypothesized to be output from devices that use a plurality of channel frequency bands, and the output source of this radio wave can be used as a decision element for the purpose of channel selection. Thus, channel reselection can be carried out in consideration of radio wave interference due to the use of a channel with overlapping frequency band by another nearby wireless LAN device, or radio wave interference with radio waves output by another device on a different wireless LAN.

Additionally, the aforementioned determination unit that, in the event that comparison of the extracted pattern with patterns of temporal change in availability of radio waves hypothesized to be output from the access point and another access point shows that these do not match, may determine that the radio wave status shows an unused free channel. With this access point, it is possible to detect a free channel that is unlikely to give rise to deterioration in radio wave status due to communication conflicts. Thus, reselection of a channel suitable for wireless LAN communication can be performed with such free channels set to higher priority as channels for switching to.

Additionally, the aforementioned determination unit that, in the event that comparison of the extracted pattern with a pattern of temporal change in availability of a radio wave hypothesized to be output from the either one of access point and another access point shows that these match, may determine that the radio wave status shows an in-use channel by either one of the access point and another access point. With this access point, it is possible to detect channels that are highly likely to give rise to deterioration in radio wave status due to communication conflicts or radio wave interference. Thus, reselection of a channel suitable for wireless LAN communication can be performed with such channels set to low priority as channels for switching to.

Additionally, the aforementioned determination unit that, in the event that comparison of the extracted pattern with a pattern of temporal change in availability of a radio wave hypothesized to be output from another wireless communication device different from the access point shows that these match, may determine that the radio wave status shows an in-use channel by the other wireless communication device. With this access point, it is possible to determine channels that are highly likely to give rise to deterioration in radio wave status due to radio wave interference by other wireless communication devices. Thus, reselection of a channel suitable for wireless LAN communication can be performed with such channels set to low priority as channels for switching to. The detection unit may store a pattern output by either one of a ham radio device and a cordless phone, as the pattern output by the wireless communication device.

Additionally, the aforementioned determination that, in the event that comparison of the extracted pattern with a pattern of temporal change in availability of a radio wave hypothesized to be output from an electronic device that emits waves of unwanted electromagnetic radiation of the plurality of channel frequency bands shows that these match, may determine that the radio wave status shows an failure channel by the electronic device. With this access point, it is possible to determine channels that are highly likely to give rise to deterioration in radio wave status due to electromagnetic interference by electronic devices. Thus, reselection of a channel suitable for wireless LAN communication can be performed with such channels set to low priority as channels for switching to. The detection unit may store a pattern output by either one of a microwave oven and high frequency electromagnetic radiation therapy equipment, as the pattern output by the electronic device.

BEST MODE FOR CARRYING OUT THE INVENTION

In order to provide a clearer understanding of the constitution and advantages of the invention set forth hereinabove, an access point embodying the present invention is described below in the following order.

A. Arrangement of Wireless LAN

B. Arrangement of Access Point 10

C. Operation of Access Point 10

C-(1): List Creation Process

C-(2): Communication CH Management Process

C-(3): Duty Factor Determination Process

C-(4): Output Source Determination Process

D. Other Embodiments

Herein, of the two possible levels of a binary signal, "H level" refers to "1" and "L level" refers to "0."

A. Arrangement of Wireless LAN

Figure 1:
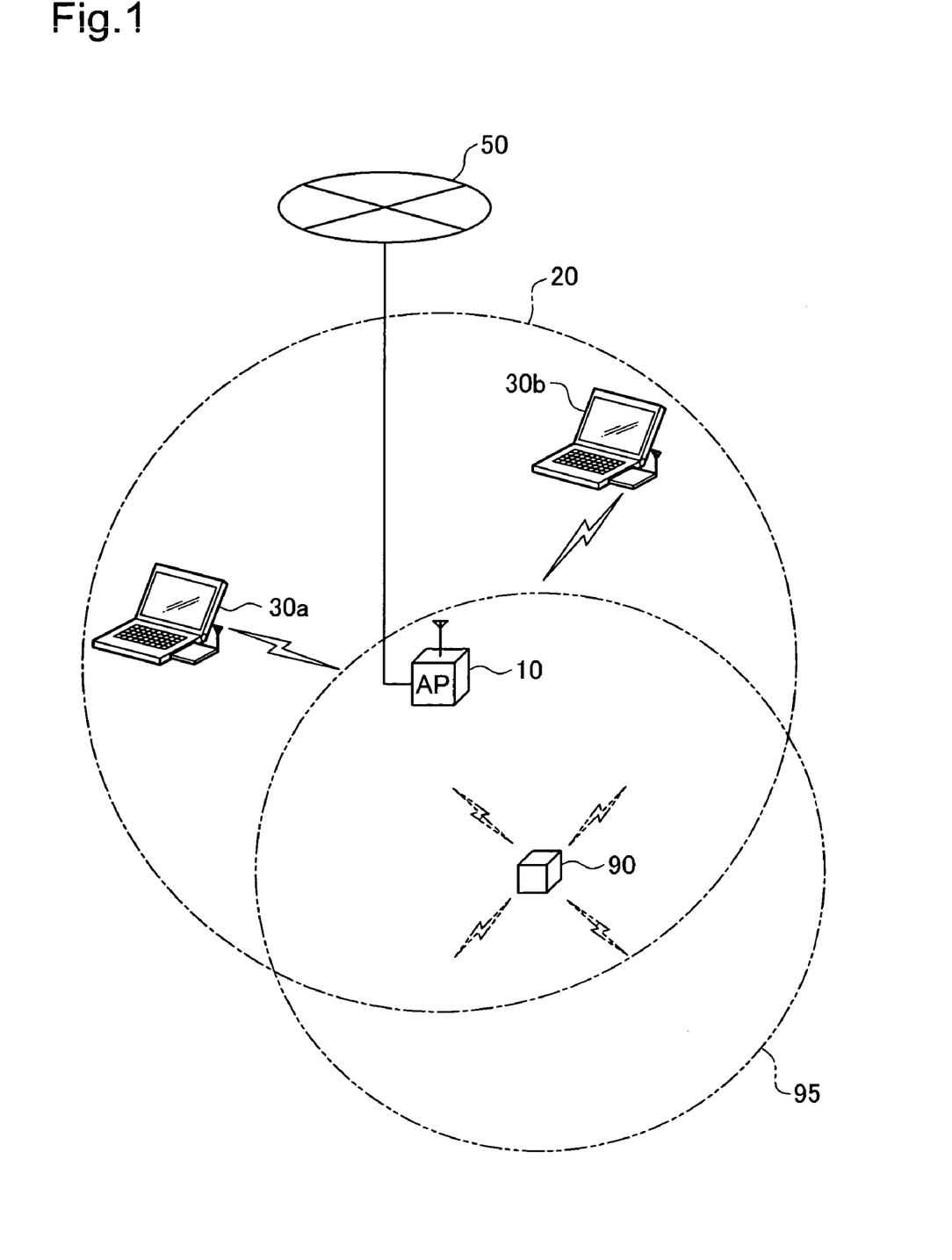
FIG. 1 is an illustration depicting a simplified arrangement of a wireless LAN provided by an access point 10.

A simplified arrangement of the wireless LAN provided by the access point 10 pertaining to an embodiment of the invention is described. FIG. 1 is an illustration depicting a simplified arrangement of a wireless LAN provided by the access point 10. The access point 10 can provide a wireless LAN to terminal devices 30a, 30b within a wireless zone 20 that is the radio wave transmission range of wireless LAN communication. That is, the wireless LAN is composed of the access point 10 and the terminal devices 30a, 30b. This access point 10 and the terminal devices 30a, 30b are wireless LAN devices that conform to the IEEE 802.11b wireless LAN standard. As noted, wireless LAN channels based on this standard are assigned the 14 channels shown in FIG. 11. Wireless LAN communications which exchange data among wireless LAN devices are carried out among the wireless LAN devices using any of these channels. While two terminal devices are shown in FIG. 1, in actual practice, the access point 10 can provide a wireless LAN to up to any number of devices, depending on its connection capabilities.

The access point 10 is connected to a wide area network, i.e. the Internet 50. Via this connection, the access point 10 can exchange data with other nodes connected to the Internet 50. By means of this arrangement, the terminal devices 30a, 30b are connected to the Internet 50 via the access point 10, making possible Internet communication in which information is exchanged with other nodes connected to the Internet 50. Internet communication may take the form of acquiring Web content, sending and receiving e-mail, Internet telephony, or the like.

Deterioration of radio wave status on a channel of the wireless LAN provided by the access point 10 will now be described. Let it be assumed that a device 90 different from the access point 10 is situated close to the access point 10. The device 90 outputs electromagnetic waves of the same frequency band as the channel currently used for the wireless LAN by the access point 10. The electromagnetic waves output by the device 90 produce effects such as lowered transmission speed or communications failure of wireless LAN communications within its zone of effect 95, and thus degrade radio wave status on the channel. For example, in the case depicted in FIG. 1, since the access point 10 has entered the zone of effect 95, wireless LAN communications with the terminal devices 30a, 30b will not be able to be carried out smoothly during periods when electromagnetic waves are output by the device 90.

B. Arrangement of Access Point 10

Figure 2:
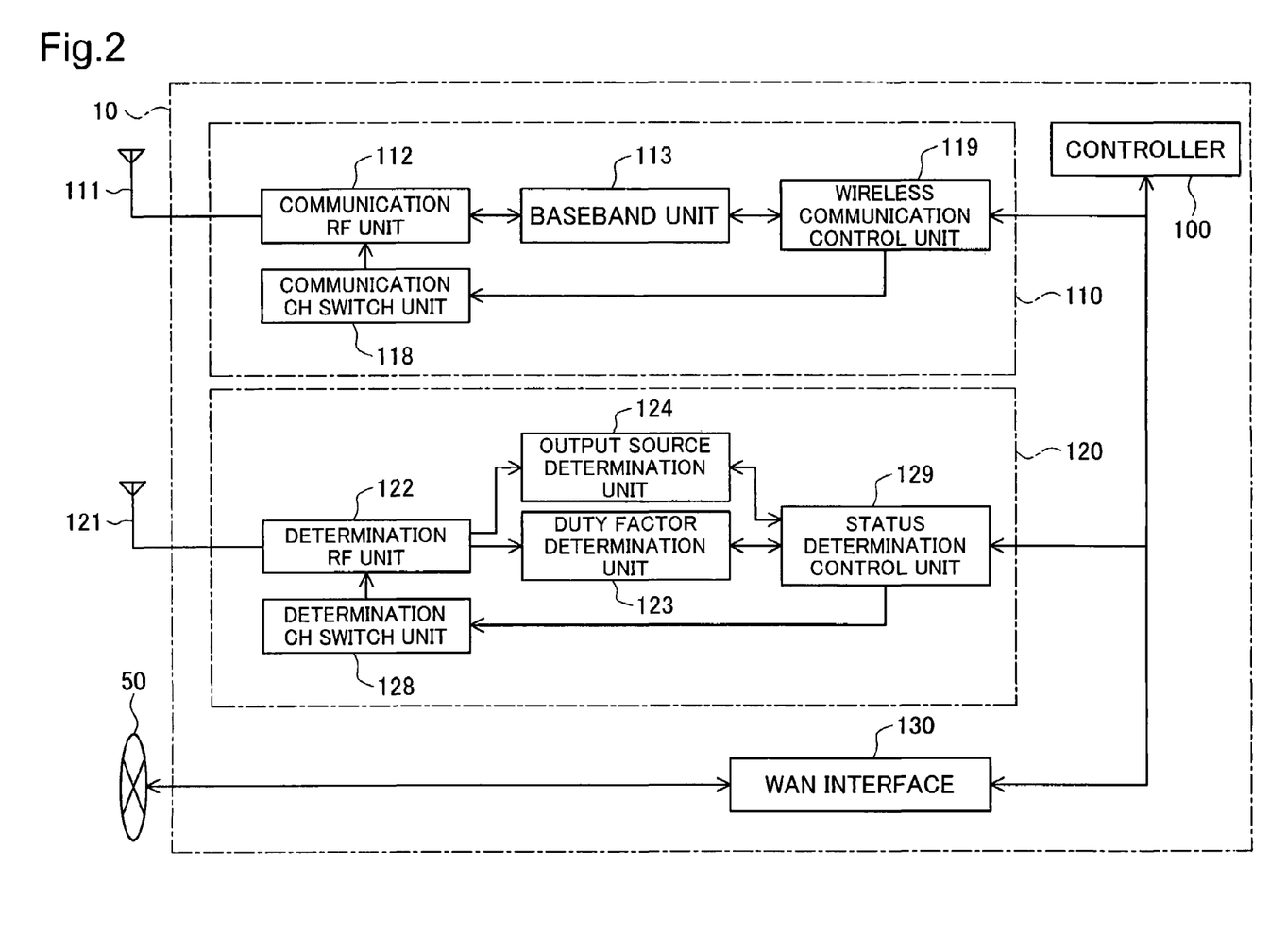
FIG. 2 is a block diagram depicting functionally the internal arrangement of the access point 10.

The internal arrangement of the access point 10 will now be described. FIG. 2 is a block diagram depicting functionally the internal arrangement of the access point 10. The access point 10 comprises a communication unit 110 for performing exchange of information via the wireless LAN; and a status determination unit 120 for determining radio wave statuses on each of the plurality of channels, in parallel with exchange of information by the communication unit 110. It further comprises a WAN interface 130 for transferring information to and from the Internet 50, and a controller 100 for carrying out control of various kinds in the access point 10.

The communication unit 110 will now be described. The communication unit 110 comprises a communication antenna 111, a communication RF unit 112, a baseband unit 113, a communication CH switch unit 118, and a wireless communication control unit 119. These elements are connected electrically, starting from the radio signal receiving end, in the order communication antenna 111, communication RF unit 112, baseband unit 113, wireless communication control unit 119, with the communication CH switch unit 118 connected electrically to the communication RF unit 112 and the wireless communication control unit 119. Between the communication antenna 111 and the communication RF unit 112 are exchanged radio frequency (hereinafter RF) signals. Between the communication RF unit 112 and the baseband unit 113 are exchanged intermediate frequency (hereinafter IF) signals. Between the baseband unit 113 and the wireless communication control unit 119 are exchanged digital signals.

The communication antenna 111 is an antenna equipped with various kinds of amps, filters, a switch for switching between radio wave transmission and reception, and so on. This communication antenna 111 performs input and output of radio waves for the purpose of carrying out wireless LAN communications. The communication RF unit 112 is composed of a one-chip microprocessor equipped with various transmission/reception mixers, amps, filters, and the like. This communication RF unit 112 performs conversion between RF signals and IF signals (hereinafter termed RF/IF conversion). The baseband unit 113 is composed of a one-chip microprocessor equipped with various mixers, amps, filters, and the like for use in sending and receiving. This baseband unit 113 performs conversion between IF signals and baseband signals, and A/D conversion between baseband signals and digital signals. The wireless communication control unit 119 is also referred to as the Media Access Controller (hereinafter MAC), and is composed of a one-chip microprocessor equipped with a CPU, ROM, RAM, and various communication interfaces. The wireless communication control unit 119 performs control of various kinds relating to wireless LAN communications.

The communication CH switch unit 118 is composed of an oscillator whose oscillation frequency varies depending on input voltage (Voltage Controlled Oscillator, hereinafter VCO) or the like. This communication CH switch unit 118 can switch the channel used for wireless LAN communications in the communication unit 110, by means of varying the frequency of the signal injected into the transmission/reception mixer of the communication RF unit 112, on the basis of input voltage which is the control signal of the wireless communication control unit 119.

The status determination unit 120 will now be described. The status determination unit 120 is composed of hardware separate from the hardware for realizing the communication unit 110 described previously, and comprises a determination antenna 121, a determination RF unit 122, a duty factor determination unit 123, an output source determination unit 124, a determination CH switch unit 128, and a status determination control unit 129. These elements are connected electrically, starting from the radio signal receiving end, in the order determination antenna 121, determination RF unit 122, with the determination RF unit 122 connected electrically to the duty factor determination unit 123 and the status determination control unit 129. The duty factor determination unit 123 and the status determination control unit 129 are connected enabling exchange of information with the status determination control unit 129. The determination CH switch unit 128 is connected electrically to the determination RF unit 122 and the status determination control unit 129. An RF signal is transmitted from the determination antenna 121 to the determination RF unit 122. An IF signal is transmitted from the determination RF unit 122 to the duty factor determination unit 123 and the output source determination unit 124. Digital signals are exchanged between the status determination control unit 129, and both the duty factor determination unit 123 and the output source determination unit 124.

The determination antenna 121 is an antenna equipped with various kinds of reception amps, filters, and so on. This determination antenna 121 receives input of radio waves for the purpose of detecting radio wave statuses on each channel. In the embodiment, the communication antenna 111 and the determination antenna 121 are constituted as separate elements, but the communication antenna 111 and the determination antenna 121 could instead by composed of a single antenna. The determination RF unit 122 is composed of a one-chip microprocessor equipped with various reception mixers, amps, filters, and the like. This determination RF part 122 converts an RF signal input by the determination antenna 121 into an IF signal.

The duty factor determination unit 123 is composed of a one-chip microprocessor equipped with various reception mixers, amps, filters, and the like, and of a one-chip microprocessor similar to that used for MAC. This duty factor determination unit 123 converts an IF signal output by the determination RF unit 122 into a baseband signal, and then into a digital signal. A frame sent or received during exchange of information in the access point 10 itself or with another access point is analyzed from this digital signal. This frame contains, in addition to data constituting the informational content, data such as a MAC (Media Access Control) address or IP (Internet Protocol) address. The access point that transferred the frame is identified from the MAC address or IP address. The receive time required to receive the IF signal from the frame is also detected. By so doing, by way of the radio wave status of the channel, a duty factor indicating the time for which the radio wave was used by the access point 10 or another access point during a specified time period can be determined from the IF signal output by the determination RF unit 122. The determined duty factor is transmitted to the status determination control unit 129. These processes are carried out through execution of a program stored in ROM etc. on the one-chip microprocessor.

The output source determination unit 124 is composed of a detection circuit for detecting IF signals from the determination RF unit 122, a CPU, ROM, RAM, and the like. In this ROM are stored patterns of temporal change in availability of detected radio waves hypothesized to be output from a number of devices that use same channel frequency bands as wireless LAN communications. Upon receiving IF signal input, the output signal of the detection circuit of the output source determination unit 124 goes from H level to L level. From the signal output by the detection circuit, the one-chip microprocessor of the output source determination unit 124 extracts a pattern of temporal change in availability of the detected radio wave. By comparing this extracted pattern with the patterns stored in ROM, the output source of the detected radio wave is determined, from among the several devices whose radio wave patterns are stored in memory. Possible such devices include, in addition to the wireless LAN devices, other wireless communication devices such as ham radio transmitters and cordless phones; or electronic devices that output unwanted electromagnetic radiation, such as microwave ovens and high frequency electromagnetic radiation therapy equipment. The data for the determined output source is transmitted to the status determination control unit 129. These processes are carried out through execution of a program stored in ROM etc. on the one-chip microprocessor.

Like the communication CH switch unit 118, the determination CH switch unit 128 is composed of a VCO or the like. The determination CH switch unit 128, by varying the frequency of the signal injected into the transmission/reception mixer of the determination RF unit 122 on the basis of input voltage which is the control signal of the status determination control unit 129, can switch the channel on which status determination is carried out in the status determination unit 120.

The controller 100 is connected to the wireless communication control unit 119, the status determination control unit 129, and the WAN interface 130 so that information exchange is possible. These parts connected to the controller 100 can exchange information with one another via the controller 100. By means of this arrangement, the wireless communication control unit 119 and the status determination control unit 129 can exchange information, and the communication control unit 119 and the WAN interface 130 can exchange information to achieve Internet connectivity.

C. Operation of Access Point 10

Operation of the access point 10 will now be described. In the access point 10, the communication unit 110 and the status determination unit 120 carry out processes of various kinds in parallel under management control by the controller 100. Specifically, it is possible for the communication unit 110 to carry out wireless LAN communications even while the status determination unit 120 is determining radio wave status on each channel.

C-(1): List Creation Process

Figure 3:
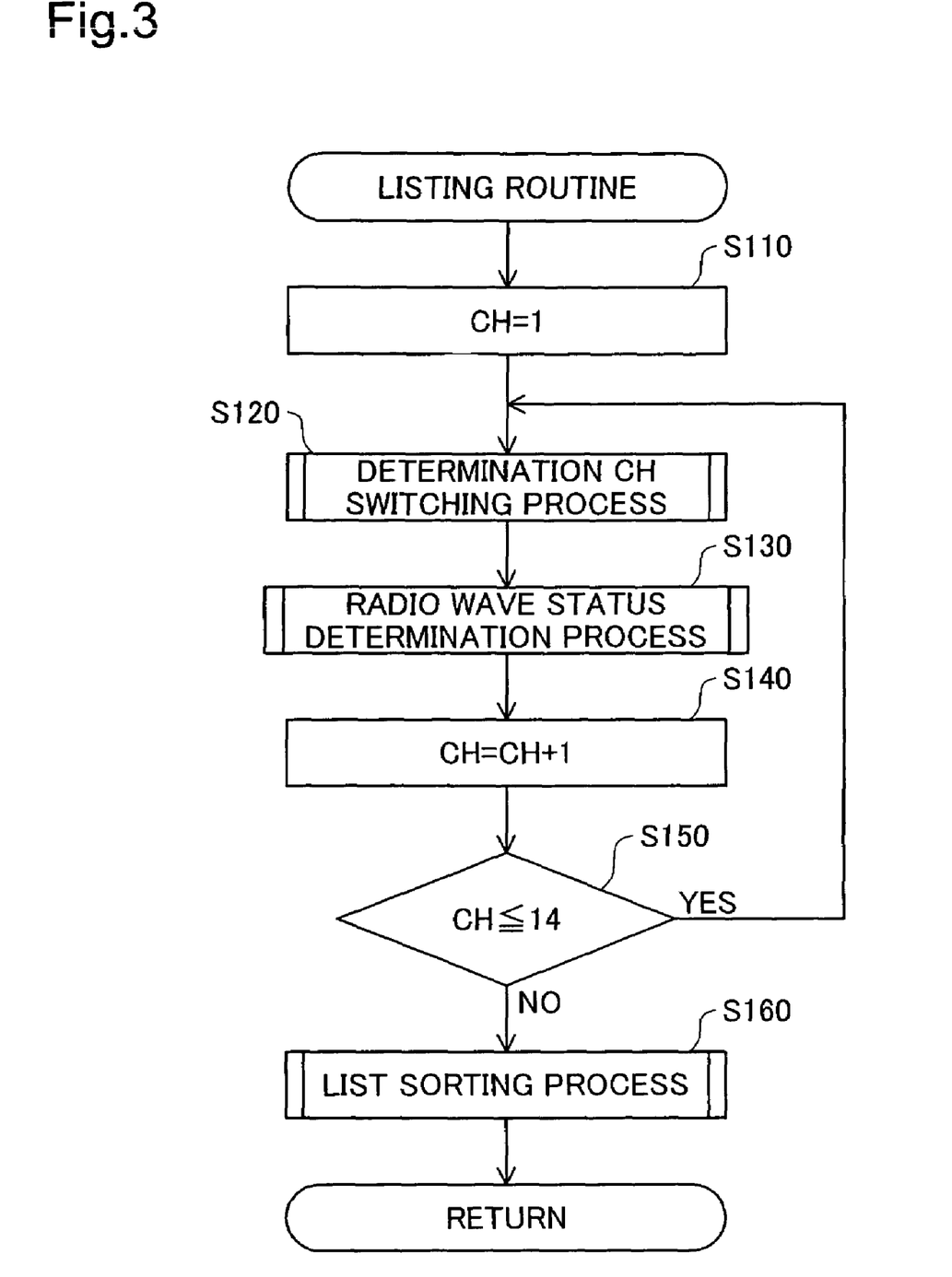
FIG. 3 is a flowchart illustrating the list creation process by the status determination control unit 129.

The list creation process executed by the status determination control unit 129 of the status determination unit 120 is now described. FIG. 3 is a flowchart depicting the list creation process of the status determination control unit 129. The status determination control unit 129 initiates this list creation process at predetermined timing. Once the process is initiated, a variable CH for the purpose of deciding upon a channel number whose radio wave status is to be determined is set to "CH=1" (Step S110). This variable CH value corresponds to the "Channel No." value of the channel used in the wireless LAN shown in FIG. 11. A determination CH switching process is then carried out (Step S120). In the determination CH switching process, in order to receive a radio wave on the channel corresponding to the variable CH, a control signal corresponding to the variable CH is transmitted to the determination CH switch unit 128, which switches to the channel whose radio wave status is to be determined.

After the determination CH switching process (Step S120), a radio wave status determination process is carried out (Step S130). In the radio wave status determination process, the duty factor determination unit 123 is queried for duty factor data, and the output source determination unit 124 is queried for output source data. Subsequently, duty factor data is received from the duty factor determination unit 123, and output source data is received from the output source determination unit 124. The status determination control unit 129 stores the received radio wave status data in RAM provided within the status determination control unit 129.

After the radio wave status determination process has been carried out (Step S130), the variable channel CH is set to "CH=CH+1" (Step S140), and it is decided whether the variable CH is "CH≦14" (Step S150). In the event that the variable CH is "CH≦14" (Step S150), this means that radio wave status has not yet been determined on all channels, and so the process beginning with the detected CH switching process.

By so doing, the status determination control unit 129 can obtain radio wave status data for all channels.

If on the other hand, the variable CH is not "CH≦14" (Step S150), this means that radio wave status has been determined on all channels, so a list sorting process (Step S160) is carried out. In the list sorting process, on the basis of duty factor and output source data for all channels stored in the course of the radio wave status determination process, the priority sequence of the channels is sorted, and a list is created and stored in RAM in the status determination control unit 129. This channel priority sequence is a sequence appropriate for performing wireless LAN communications in the communication unit 110. After performing the list sorting process (Step S160), the status determination control unit 129 terminates the list creation process.

Figure 4:
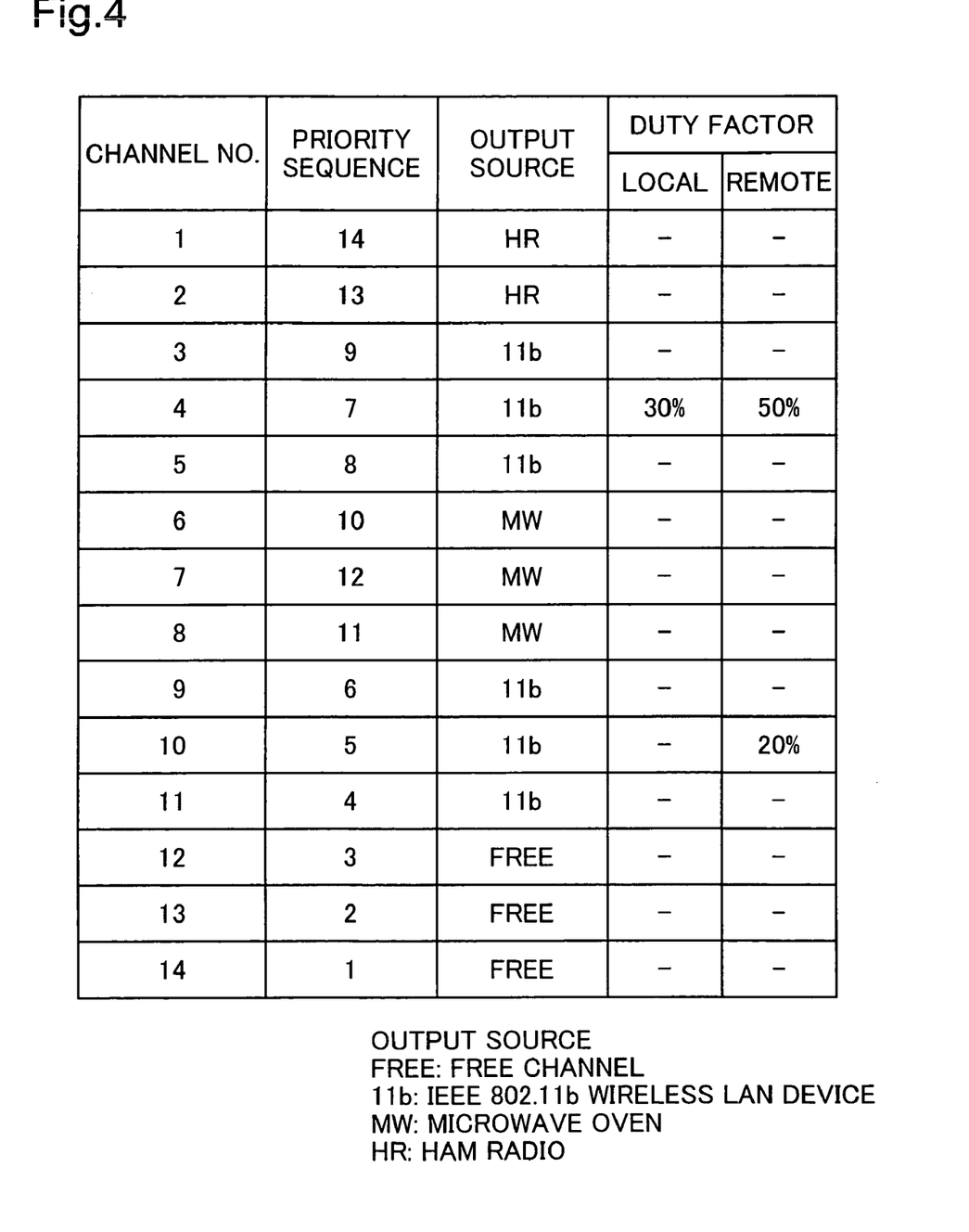
FIG. 4 is an illustration showing an example of a list created by the list creation process.

The list created in the list sorting process (Step S160) will now be described. FIG. 4 is an illustration showing an example of a list created by the list creation process. FIG. 4 lists "priority sequence", "output source", and "duty factor" for each "Channel No.". The "duty factor" column lists a "local" duty factor indicating exchange of information by the access point 10, and a "remote" duty factor indicating exchange of information by an access point other than the access point 10. "Channel No." lists 14 channels numbered from 1 to 14. "Priority sequence" assigns to channels a sequence of 1 to 14, in order of best radio wave status; a lower number indicates higher priority in the sequence. The criteria for deciding the priority sequence of the list shown in FIG. 4 are, in order from highest priority in the sequence, a free channel; a channel with low duty factor; a channel with high duty factor; a channel whose output source is a microwave oven; and a channel whose output source is a ham radio. For channels of a same given output source or duty factor, priority sequence is determined in consideration of the effects of radio wave interference with neighboring channels. The criteria for deciding the priority sequence are not limited to these decision criteria; various decision criteria may be adopted taking into consideration factors such as the usage environment of the wireless LAN and so on, or decision criteria may be adopted taking into consideration radio wave strength in addition to output source and duty factor.

C-(2): Communication CH Management Process

Figure 5:
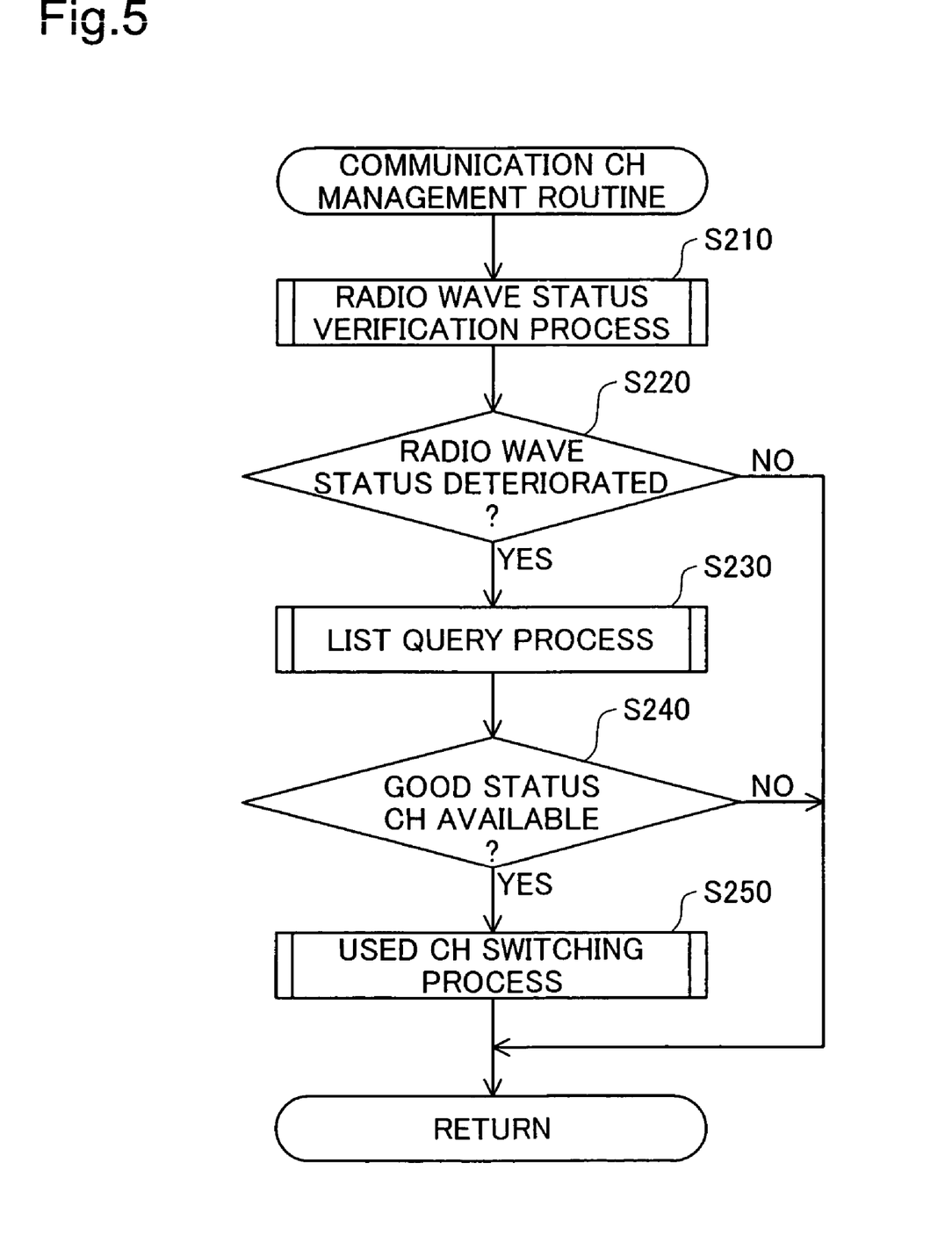
FIG. 5 is a flowchart illustrating the communication CH management process by the wireless communication control unit 119.

The communication CH management process executed by the wireless communication control unit 119 of the communication unit 110 will now be described. FIG. 5 is a flowchart illustrating the communication CH management process by the wireless communication control unit 119. When wireless LAN communication is first initiated, the wireless communication control unit 119 carries out wireless LAN communication using an initial channel. This initial channel may be a specific predetermined channel, or a randomly selected one. Alternatively, a free channel may be determined by the status determination unit 120, and used as the initial channel. The wireless communication control unit 119 performs wireless LAN communication, as well as initiating this communication CH management process at specific timing. Once the process is initiated, a radio wave status verification process is carried out (Step S210). In this radio wave status verification process, radio wave status of the channel being used for wireless LAN communications is verified from data detected by the wireless communication control unit 119 itself, such as wireless LAN communication radio wave field strength, data error rate, communication speed, usage rate, etc., or data received from the terminal devices 30a, 30b.

After the radio wave status verification process has been performed (Step S210), a decision is made as to whether radio wave status of the channel in use has deteriorated (Step S220). This decision as to whether radio wave status has deteriorated is made on the basis of specific pre-established criteria. Examples of such predetermined criteria include: in the event that effective communication speed falls below a specific value; in the event that transfer speed mode shifts to low speed mode; in the event of an increase in the data resend rate; or in the event that a timeout, in which there no received response within a specified time period after transmitting data, is detected. If it is determined that there is no deterioration of radio wave status (Step S220), since there is no need to switch the channel in use, the communication CH management process is terminated.

If on the other hand, it is decided that radio wave status has deteriorated (Step S220), a list query process is carried out for the purpose of verifying radio wave status of channels other than the channel in use (Step S230). In the list query process, the status determination control unit 129 is requested to transmit the list created and stored by the status determination control unit 129 in the list creation process described previously. Upon receiving the request, the status determination control unit 129 sends the list to the wireless communication control unit 119, whereupon the wireless communication control unit 119 receives the list and stores in RAM in the wireless communication control unit 119.

After the list query process has been performed (Step S230), a process is carried out to decide, on the basis of the received list, whether there is a channel having higher priority in the sequence, i.e. better radio wave status, than the channel being used (Step S240). In the event that there is no channel available with higher priority than the channel being used (Step S240), since there is no need to switch the channel being used, the communication CH management process is terminated. If on the other hand, a channel with higher priority than the channel being used is available (Step S240), a used CH switching process is performed in order to switch the channel used to the higher priority channel (Step S250). In the used CH switching process, a control signal corresponding to the frequency band of the channel to be switched to is send to the communication CH switch unit 118, to effect switching of the channel used. After the used CH switching process has been performed (Step S250), the used CH switching process is terminated.

C-(3): Duty Factor Determination Process

Figure 6:
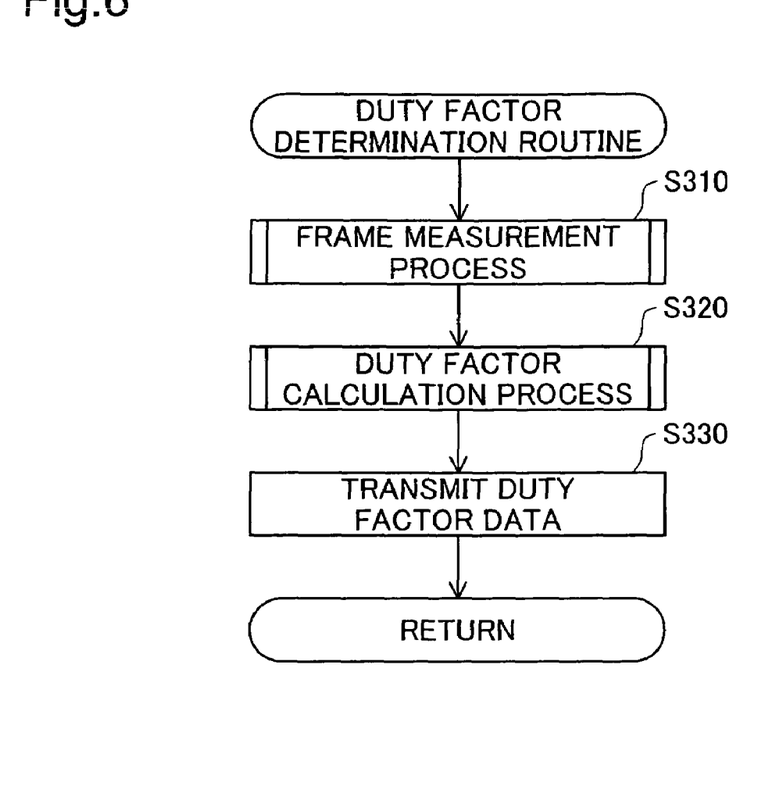
FIG. 6 is a flowchart illustrating the duty factor determination process of the duty factor determination unit 123.

The duty factor determination process executed by the CPU in the duty factor determination unit 123 of the status determination unit 120 will now be described. FIG. 6 is a flowchart illustrating the duty factor determination process of the duty factor determination unit 123. Upon receiving from the status determination control unit 129 a duty factor data query in the radio wave status determination process described previously (Step S130 in FIG. 3), the duty factor determination unit 123 initiates the duty factor determination process. When the process is initiated, a frame measurement process is initiated (Step S310). In the frame measurement process, for each frame received during a specific time period, the reception time of the frame is measured, and the access point 10 handling the frame is identified. This data is stored in RAM in the duty factor determination unit 123.

Figure 7:
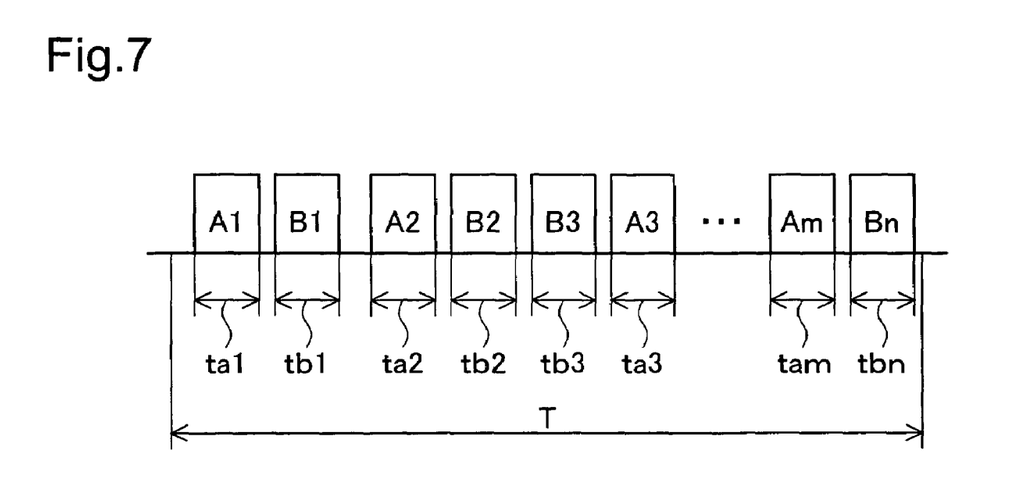
FIG. 7 is an illustration showing an example of frames received during a certain period by the duty factor determination unit 123.

FIG. 7 is an illustration showing an example of frames received during a certain period by the duty factor determination unit 123. In FIG. 7, time is plotted on the horizontal axis, and reception of frames during a specific time period T is depicted. A1 to Am denote frames handled by the access point 10, and ta1 to tam denote reception times of each of these frames. B1 to Bn denote frames handled by another access point, and tb1 to tbn denote reception times of each of these frames. In the frame measurement process, data measured during reception times ta1 to tam and during reception times tb1 to tbn is measured and stored.

When the frame measurement process terminates after the specified time interval has elapsed (Step S310), a duty factor calculation process is initiated (Step S320). In this duty factor calculation process, duty factors are calculated on the basis of Eq. (1) given below, from the data stored in the frame measurement process described above.

$$Pda=((ta1+ta2+\ldots+tam)/T)\times 100$$
$$Pdb=((tb1+tb2+\ldots+tbn)/T)\times 100 \quad (1)$$

Here, Pda denotes the duty factor of the access point 10, and Pdb denotes the duty factor of the other access point. These calculated duty factors Pda, Pdb are stored in RAM in the duty factor determination unit 123.

Once the duty factor calculation process is completed (Step S320), the stored duty factor Pda, Pdb data is sent to the status determination control unit 129 (Step S330), and the duty factor determination process terminates.

Figure 8:
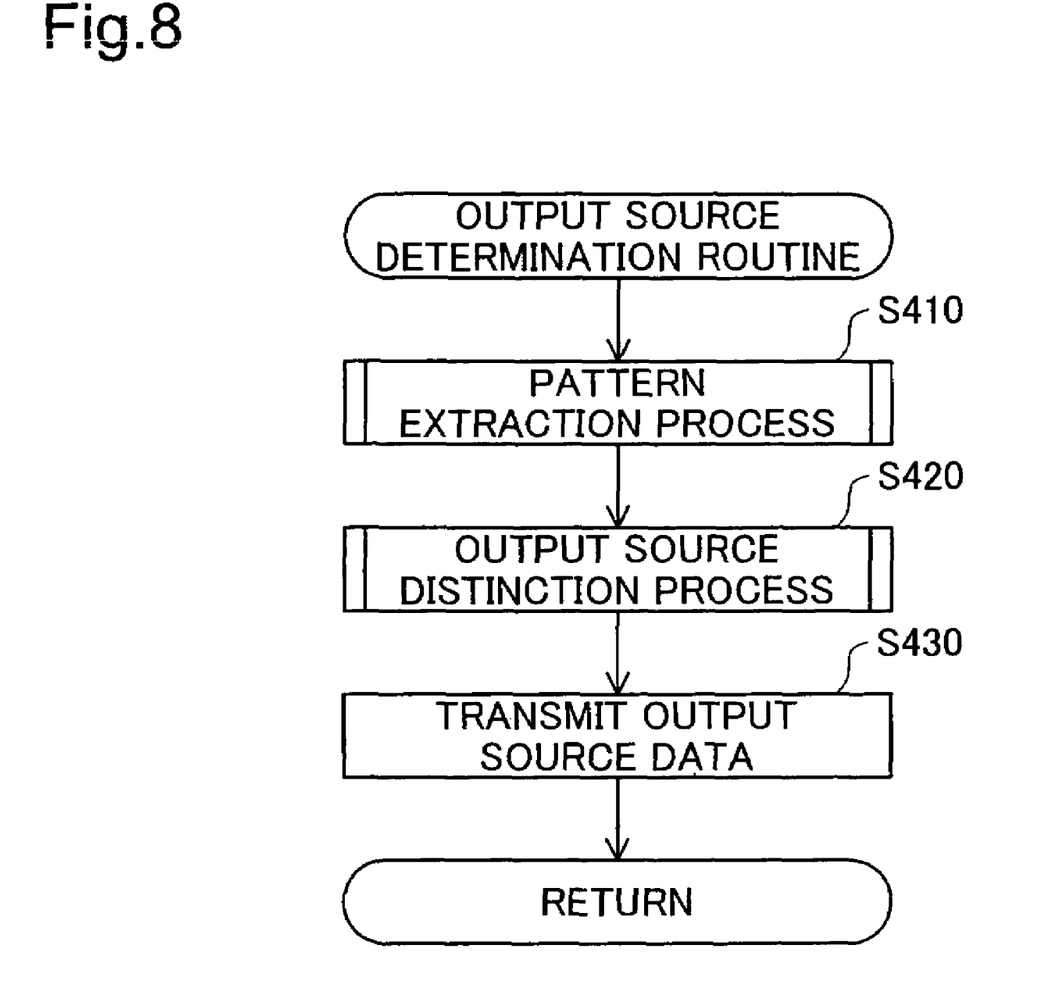
FIG. 8 is a flowchart illustrating the output source determination process by the output source determination unit 124.

C-(4): Output Source Determination Process:

The output source determination process executed by the CPU in the output source determination unit 124 of the status determination unit 120 will now be described. FIG. 8 is a flowchart illustrating the output source determination process by the output source determination unit 124. Upon receiving from the status determination control unit 129 a query for the output source data in the radio wave status determination process described previously (Step S130 in FIG. 3), the output source determination unit 124 initiates the output source determination process. Once the process is initiated, a pattern extraction process is initiated (Step S410). In the pattern extraction process, a pattern of temporal change in a radio signal received over a specific period of time is extracted.

Figure 9:
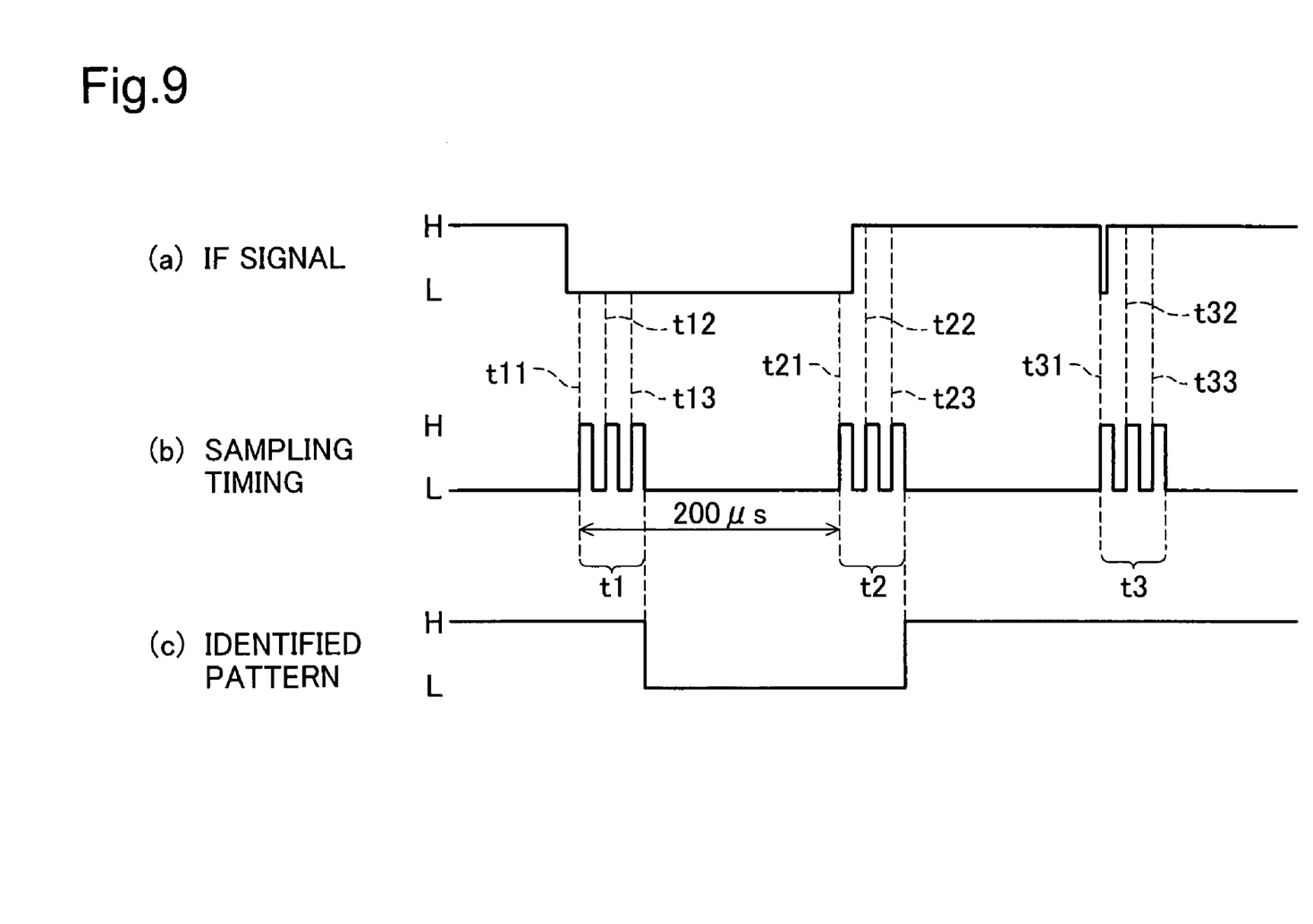
FIG. 9 is an illustration showing an example of extraction of the pattern of temporal change of a radio signal by the output source determination unit 124.

FIG. 9 is an illustration showing an example of extraction of the pattern of temporal change of a radio signal by the output source determination unit 124. FIG. 9 plots time on the horizontal axis, with the change in the IF signal represented at top, the change in sampling timing represented in the middle, and an extracted pattern represented at bottom When the sampling timing goes to H level, the output source determination unit 124 senses the IF signal and extracts a pattern. The sampling timing interval is 200 microseconds (hereinafter denoted as μs), with the IF signal being sampled three times in succession during a single timing cycle. The pattern is extracted from the signal level that is sampled most frequently among the three samplings. By so doing, noise of the IF signal may be eliminated. In FIG. 9, at timing t1, since the IF signal is L level in samplings t11, t12, t13, the extracted pattern goes from H level to L level. At subsequent timing t2, the IF signal is L level in sampling t21, whereas the IF signal is H level in samplings t22 and t23, so the extracted pattern goes from L level to H level. At subsequent timing t3, the IF signal is L level in sampling t31, whereas the IF signal is H level in samplings t32 and t33, so the L level IF signal in sampling t31 is determined to be noise, and the extraction pattern remains at H level. The sampling timing and number of samplings are not limited to the numerical values given above, and may be established in consideration of various factors.

When the pattern extraction process concludes after the specified time period has elapsed (Step S410), an output source distinction process is performed (Step S420). In the output source distinction process, the extracted pattern is compared with patterns stored in the ROM in the output source determination unit 124. By means of this comparison, it is determined to which stored pattern the extracted pattern corresponds. By so doing, the output source of the received electromagnetic wave can be determined.

Figure 10:
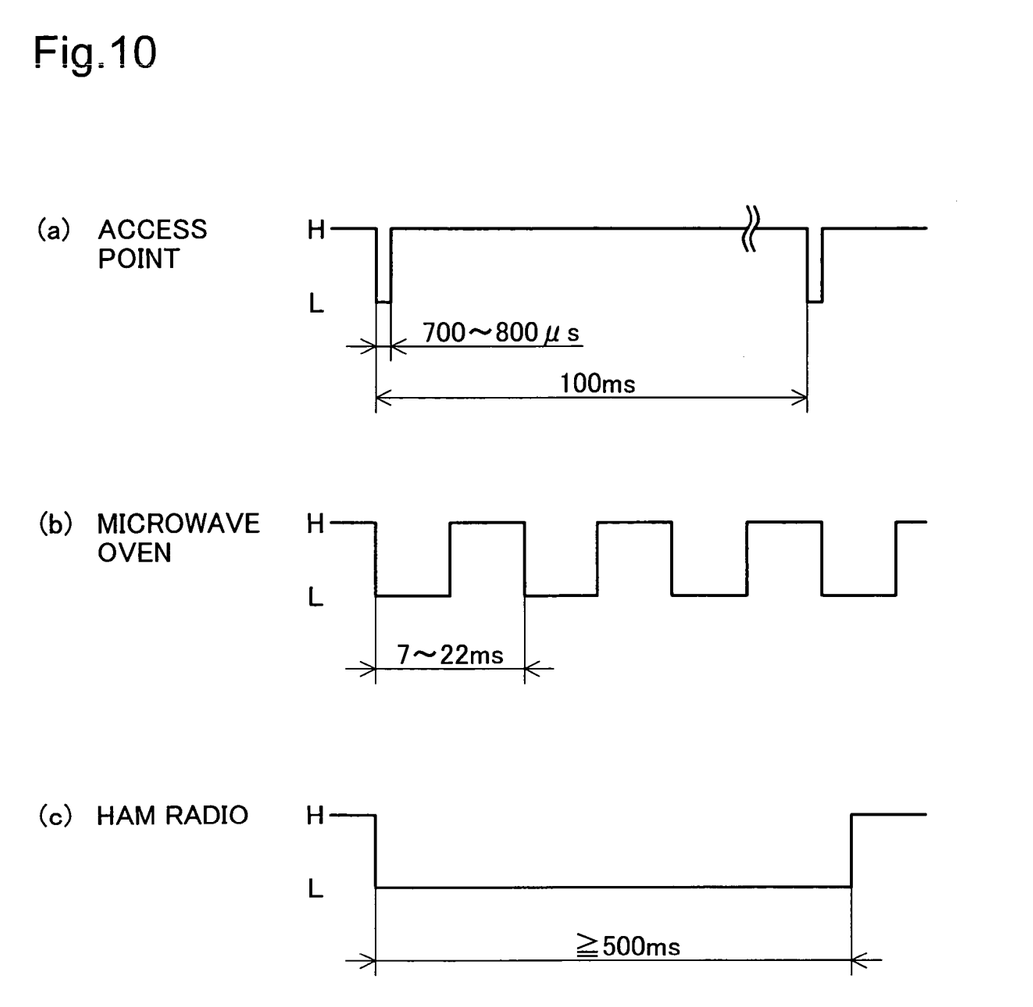
FIG. 10 is a illustration showing an example of patterns stored in memory in the output source determination unit 124.

FIG. 10 is an illustration showing an example of patterns stored in memory in the output source determination unit 124. FIG. 10 plots time on the horizontal axis, with the pattern of a beacon signal output by an access point represented at top, the pattern of an electromagnetic wave output by a microwave range shown at middle, and the pattern of a signal output by a ham radio shown at bottom. An access point periodically sends a beacon signal, for the purpose of carrying out exchange of information with terminal devices. This beacon signal is a signal that is output at a cycle of about 100 milliseconds (hereinafter denoted as ms) and pulse width of about 700-800 μs. Accordingly, where this signal pattern and the extracted pattern are compared and decided to match, it is determined that the output source is an access point. A microwave oven heats food using electromagnetic waves of about 2.4 GHz generated by an internal magnetron. During heating, unwanted electromagnetic radiation is output in the form of a continuously pulsed signal with a cycle of about 7-22 ms. Accordingly, where this signal pattern and the extracted pattern are compared and decided to match, it is determined that the output source is a microwave oven. A ham radio outputs a signal that has a larger pulse width (about 500 ms or longer) as compared to the beacon of an access point. Accordingly, where this signal pattern and the extracted pattern are compared and decided to match, it is determined that the output source is a ham radio. Where the signal is decided to not match any of these patterns, the channel is determined to be free.

Once the output source is determined and the output source distinction process is completed (Step S420), the determined output source data is sent to the status determination control part 129 (Step S430), and the output source determination process terminates.

According to the access point 10 of the invention described herein, by performing determination of radio wave status of channels with status determination unit 120 composed of hardware separate from the hardware for realizing the communication unit 110 that performs wireless LAN communications, it is possible to carry out determination of radio wave status for the purpose of channel reselection, in parallel with wireless LAN communications. Accordingly, a drop in effective communication speed due to determination of radio wave status for the purpose of channel reselection can be avoided.

Additionally, since the status determination unit 120 is furnished with a duty factor determination unit 123 for determining duty factor, duty factor can be used as a decision criterion for channel reselection. Accordingly, channel reselection can be carried out in consideration of the extent of conflict of communications due to the use of the same channel by a large number of wireless LAN devices.

Additionally, since the status determination unit 120 is furnished with an output source determination unit 124 for determining output source, output source can be used as a decision criterion for channel reselection.

Accordingly, channel reselection can be carried out in consideration of radio wave interference due to the use of a channel with overlapping frequency band by another nearby wireless LAN device, or radio wave interference with radio waves output by another device on a different wireless LAN.

D. Other Embodiments

While the invention has been described herein in terms of certain preferred embodiments, it is not limited to the embodiments set forth herein, and may be reduced to practice in other forms without departing from the spirit of the invention. For example, the status determination unit 120 is not limited to determining radio wave status at specific timing; the status determination unit 120 may instead initiate determination of radio wave status on the basis of an instruction from the communication unit 110 verifying degradation of radio wave status. The wireless LAN provided by the access point 10 is not limited to wireless LAN communication based on the IEEE 802.11b standard, but may instead be wireless LAN communication based on the IEEE 802.11g standard, or some other form of wireless communication. The channel radio wave status determined by the status determination unit 120 is not limited to duty factor or output source; radio wave field strength or the like can also serve as radio wave status. The duty factor determined by the duty factor determination unit 123 need not be detected from frame signals, but may instead by determined from the pattern of temporal change of a radio signal, in the same manner as the output source determination unit 124. Output sources determined by the source determination unit 124 are not limited to those in the embodiment herein; non-IEEE 802.11b wireless LAN devices or other wireless devices, cordless phones, or high frequency electromagnetic radiation therapy equipment may be detected as well.

INDUSTRIAL APPLICABILITY

This invention is applicable to wireless devices that exchange information with other devices using any channel from among a number of channels of different frequency bands.

What is claimed is:

1. An access point for providing a wireless local area network connection to a terminal device, by using any one of a plurality of channels of different frequency bands to exchange information, for connecting the terminal device to a wide area network, the access point comprising:
    a wireless communication unit that operable to exchange information via the wireless local area network;
    a status determination unit that includes hardware separate from hardware for realizing the wireless communication unit, wherein the status determination unit is operable to: receive radio waves for the wireless local area network, and determine, based on the radio waves, radio wave statuses on each of the plurality of channels, wherein the status determination unit comprises an output source determination unit operable to determine, as the radio wave status, an output source radiating a radio wave of the frequency band of the plurality of channels, wherein the output source includes the access point, another access point, the terminal device, a microwave oven and a ham radio;
    a channel selection unit operable to select, on the basis of the determined radio wave statuses, a selected channel for exchange of information by the wireless communication unit; and
    a channel switching unit operable to switch from a channel currently in use for exchange of information by the wireless communication unit to the selected channel.

2. An access point according to claim 1, wherein the status determination unit comprises a duty factor determination unit operable to determine, as the radio wave status, a duty factor which is a time period in which radio waves are used by either one of the access point and another access point in a given time period.

3. An access point according to claim 1, wherein the output source determination unit comprises:
    a wave detection unit operable to detect a radio wave of each frequency of the plurality of channels;
    an extraction unit operable to extract a pattern of temporal change in availability of the detected radio wave; and
    a determination unit operable to compare the extracted pattern with patterns of temporal change in availability of a detected radio wave hypothesized to be output from the plurality of devices, to determine the output source of the detected radio wave which has been output from any of the plurality of devices.

4. An access point according to claim 3, wherein the determination unit that, in the event that comparison of the extracted pattern with patterns of temporal change in availability of radio waves hypothesized to be output from the access point and another access point shows that these do not match, is operable to determine that the radio wave status shows an unused free channel.

5. An access point according to claim 3, wherein the determination unit, in the event that comparison of the extracted pattern with a pattern of temporal change in availability of a radio wave hypothesized to be output from either one of the access point and another access point shows that these match, is operable to determine that the radio wave status shows an in-use channel by either one of the access point and another access point.

6. An access point according to claim 3, wherein the determination unit, in the event that comparison of the extracted pattern with a pattern of temporal change in availability of a radio wave hypothesized to be output from another wireless communication device different from the access point shows that these match, is operable to determine that the radio wave status shows an in-use channel by the other wireless communication device.

7. An access point according to claim 6, wherein the detection unit is operable to store a pattern output by either one of a ham radio device and a cordless phone, as the pattern output by the wireless communication device.

8. An access point according to claim 3, wherein the determination unit, in the event that comparison of the extracted pattern with a pattern of temporal change in availability of a radio wave hypothesized to be output from an electronic device that emits waves of unwanted electromagnetic radiation of the plurality of channel frequency bands shows that these match, is operable to determine that the radio wave status shows an failure channel by the electronic device.

9. An access point according to claim 8, wherein the detection unit is operable to store a pattern output by either one of a microwave oven and high frequency electromagnetic radiation therapy equipment, as the pattern output by the electronic device.

* * * * *